C. ROLLIN.
PROCESS OF MAKING BARIUM OXID.
APPLICATION FILED JUNE 3, 1909.

974,921.

Patented Nov. 8, 1910.

Witnesses:
Joseph C. Stack.
Harry King.

Inventor:
Charles Rollin,
By William C. Burnett Son.
his attys.

UNITED STATES PATENT OFFICE.

CHARLES ROLLIN, OF NEWCASTLE-UPON-TYNE, ENGLAND, ASSIGNOR TO HIMSELF AND HEDWORTH BARIUM COMPANY LIMITED, OF NEWCASTLE-UPON-TYNE, ENGLAND.

PROCESS OF MAKING BARIUM OXID.

974,921.  Specification of Letters Patent.  Patented Nov. 8, 1910.

Application filed June 3, 1909. Serial No. 499,922.

*To all whom it may concern:*

Be it known that I, CHARLES ROLLIN, B. Sc., F. C. S., a subject of the King of Great Britain and Ireland, residing at Newcastle-upon-Tyne, England, have invented Improvements in the Manufacture of Barium Compounds, of which the following is a specification.

This invention has for object the manufacture in a more advantageous manner than heretofore, of barium oxid suitable for use in the manufacture of barium peroxid or for other purposes. For this purpose, pure or practically pure amorphous anhydrous barium hydroxid, in a finely powdered condition is heated to a high temperature with a barium compound, such as barium peroxid or barium nitrate, capable of evolving gas when heated and of leaving a residue consisting substantially of barium oxid. Amorphous anhydrous barium hydroxid, suitable for the purpose mentioned can be produced according to the invention described in the specification of another application for Letters Patent, Serial No. 545387, filed by me as a division of the present application. According to that invention crystallized barium hydroxid is converted into a soft white porous mass of anhydrous amorphous barium hydroxid by slowly and uniformly heating the crystallized hydroxid in a partial vacuum at a comparatively low temperature, conveniently below two hundred degrees centigrade as more particularly set forth in my said other specification.

Figure 1:
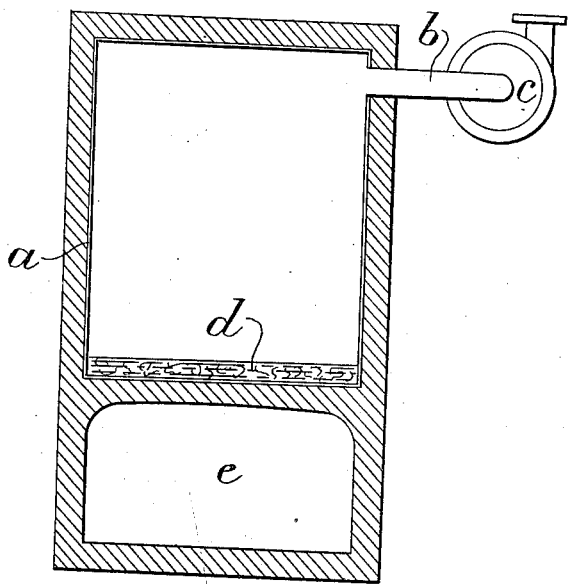
Figure 2:
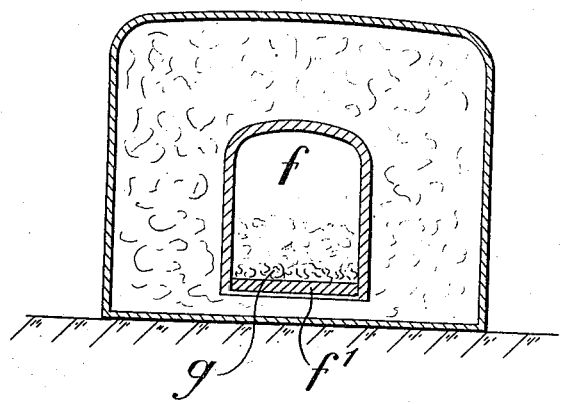

In the accompanying drawings, Figure 1 shows in transverse section, apparatus suitable for the manufacture from crystallized barium hydroxid of anhydrous amorphous barium hydroxid according to my said other invention. Fig. 2 shows in cross section, apparatus suitable for the manufacture of porous barium oxid according to my present invention.

For producing anhydrous barium hydroxid of the kind referred to, in the manner described, there may be employed apparatus such as illustrated in Fig. 1, wherein $a$ represents a retort provided with a heating flue $e$ below and having an outlet $b$ leading to an exhauster $c$ for producing a partial vacuum in the retort, the crystallized barium hydroxid $d$ to be converted into anhydrous barium hydrate being placed on the bottom of the retort and melted by the heat of hot gases passing through the flue $e$.

In carrying out the present invention, the amorphous anhydrous barium hydroxid may be intimately mixed with practically pure barium peroxid and the mixture charged into a muffle furnace $f$ (Fig. 2) the floor $f'$ of which is preferably composed of or covered with barium oxid as indicated at $g$, so that when the hydroxid melts, there shall be no foreign impurity present for it to dissolve or to affect its purity. Conveniently the mixture may be in the proportion of say about two parts by weight of barium peroxid to one part by weight of the anhydrous barium hydroxid, but it is to be understood that these proportions are given merely by way of example. The mixture is rapidly heated in the muffle to a high temperature, say to from about 600° C. to 1000° C. (six hundred to one thousand degrees centigrade) so that the amorphous barium hydroxid is caused to melt and form a pasty mass with the barium peroxid which is not melted but decomposes by the heat with evolution of oxygen which keeps the mass in a porous condition and facilitates the decomposition of the anhydrous barium hydrate, which, losing its water of hydration, is converted into barium oxid, which is also the product left by the decomposition of the peroxid. The barium oxid thus formed is very pure and porous and is specially suitable for conversion into barium peroxid by the methods ordinarily employed for the purpose.

Barium nitrate may be substituted for the barium peroxid in admixture with the anhydrous barium hydroxid, the gases escaping during its decomposition playing the same part as the oxygen from the peroxid in making the resulting mass of barium oxid sufficiently porous for subsequent conversion into barium peroxid in a satisfactory manner. I find that carbon compounds of barium, or any mixtures which produce carbonates, or give off any gaseous compound of carbon, are however disadvantageous to the successful carrying out of the invention.

I am aware that it has heretofore been proposed to produce barium oxid by fusing together barium carbid and barium hydroxid, and by fusing together barium hydroxid and barium nitrate with from 0 to 1% of carbon, but such processes differ from that hereinbefore described in that I specially avoid the use of barium carbonate or any form of carbon that could form or give rise to carbonate while the amorphous anhydrous barium hydroxid I employ differs essentially in chemical and physical characteristics from the barium hydroxid used in previous processes.

What I claim is:—

1. A process for reducing barium oxid, said process consisting in heating anhydrous barium hydroxid with a barium compound capable of evolving gas when heated.

2. A process for producing barium oxid from barium hydroxid, said process consisting in intimately mixing with the barium hydroxid, in an amorphous anhydrous condition, a barium compound capable of evolving gas when heated and heating such mixture.

3. A process for producing barium oxid, said process consisting in heating amorphous anhydrous barium hydroxid with a barium compound capable of evolving an oxidizing gas when heated and of leaving a residue of barium oxid.

4. A process for producing barium oxid, said process consisting in heating barium peroxid to a high temperature with amorphous anhydrous barium hydroxid.

5. A process for producing barium oxid from barium hydroxid, said process consisting in mixing amorphous anhydrous barium hydroxid with a barium compound capable of evolving an oxidizing gas when heated, and heating the mixture to a temperature of at least 600° C.

6. A process for producing barium oxid from amorphous anhydrous barium hydroxid, said process consisting in placing the barium hydroxid and a barium compound capable of evolving gas when heated, upon a bed of a refractory barium compound that will not injuriously affect the mass when heated, and heating the mass to a temperature of from 600° to 1000° C.

7. A process for producing barium oxid from amorphous anhydrous barium hydroxid, said process consisting in heating barium peroxid with the amorphous anhydrous barium hydroxid to a high temperature upon a bed of barium oxid.

Signed at Newcastle-upon-Tyne this twenty-fourth day of May 1909.

CHARLES ROLLIN.

Witnesses:
C. W. S. GOODGER,
ALEXR. WARDLAW.